(12) United States Patent
Krishnamachari et al.

(10) Patent No.: US 9,952,765 B2
(45) Date of Patent: Apr. 24, 2018

(54) TRANSACTION LOG LAYOUT FOR EFFICIENT RECLAMATION AND RECOVERY

(71) Applicant: NetApp, Inc., Sunnyvale, CA (US)

(72) Inventors: Srinath Krishnamachari, Mountain View, CA (US); Anshul Pundir, Sunnyvale, CA (US); Sriranjani Babu, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 186 days.

(21) Appl. No.: 14/876,572

(22) Filed: Oct. 6, 2015

(65) Prior Publication Data

US 2017/0097873 A1   Apr. 6, 2017

Related U.S. Application Data

(62) Division of application No. 14/872,793, filed on Oct. 1, 2015.

(51) Int. Cl.
*G06F 11/14* (2006.01)
*G06F 3/06* (2006.01)

(52) U.S. Cl.
CPC .......... *G06F 3/0604* (2013.01); *G06F 3/0608* (2013.01); *G06F 3/0631* (2013.01);
(Continued)

(58) Field of Classification Search
CPC .......................... G06F 11/1474; G06F 11/1471
See application file for complete search history.

(56) References Cited

U.S. PATENT DOCUMENTS 5,511,190 A   4/1996 Sharma et al.
5,937,425 A   8/1999 Ban
(Continued)

OTHER PUBLICATIONS

Cornwell, Michael, "Anatomy of a Solid-state Drive," ACM Queue—Networks, vol. 10, No. 10, Oct. 2012, pp. 1-7.
(Continued)

*Primary Examiner* — Yolanda L Wilson
(74) *Attorney, Agent, or Firm* — Cesari and McKenna, LLP

(57) ABSTRACT

A layout of a transaction log enables efficient logging of metadata into entries of the log, as well as efficient reclamation and recovery of the log entries by a volume layer of a storage input/output (I/O) stack executing on one or more nodes of a cluster. The transaction log is illustratively a two stage, append-only logging structure, wherein the first level is non-volatile random access memory (NVRAM) embodied as a NVlog and the second stage is disk, e.g., solid state drive (SSD). During crash recovery, the log entries are examined for consistency and scanned to identify those entries that have completed and those that are active, which require replay. The log entries are walked from oldest to newest (using sequence numbers) searching for the highest sequence number. Partially complete log entries (e.g., log entries in-progress when a crash occurs) may be discarded for failing a checksum (e.g., a CRC error). Old value/new value logs may be used to implement roll-forward or roll-back semantics to replay the log entries and fix any on-disk data structures, first from NVRAM and then from on-disk logs.

20 Claims, 16 Drawing Sheets

(52) U.S. Cl.
CPC .......... *G06F 3/0659* (2013.01); *G06F 3/0679* (2013.01); *G06F 11/1471* (2013.01); *G06F 11/1474* (2013.01); *G06F 2201/805* (2013.01); *G06F 2201/85* (2013.01)

(56) References Cited

U.S. PATENT DOCUMENTS

| | | | |
|---|---|---|---|
| 6,728,843 | B1 | 4/2004 | Pong |
| 7,219,260 | B1* | 5/2007 | de Forest ............ G06F 11/1474 714/15 |
| 7,249,150 | B1 | 7/2007 | Watanabe et al. |
| 7,325,059 | B2 | 1/2008 | Barach et al. |
| 7,644,087 | B2 | 1/2010 | Barkai et al. |
| 7,680,837 | B2 | 3/2010 | Yamato |
| 7,996,636 | B1 | 8/2011 | Prakash et al. |
| 8,082,390 | B1 | 12/2011 | Fan et al. |
| 8,099,396 | B1 | 1/2012 | Novick et al. |
| 8,205,065 | B2 | 6/2012 | Matze |
| 8,261,085 | B1 | 9/2012 | Fernandez Gutierrez |
| 8,341,457 | B2 | 12/2012 | Spry et al. |
| 8,417,987 | B1 | 4/2013 | Goel et al. |
| 8,495,417 | B2 | 7/2013 | Jernigan, IV et al. |
| 8,539,008 | B2 | 9/2013 | Faith et al. |
| 8,560,879 | B1 | 10/2013 | Goel |
| 8,595,595 | B1 | 11/2013 | Grcanac et al. |
| 8,806,115 | B1 | 8/2014 | Patel et al. |
| 8,832,363 | B1 | 9/2014 | Sundaram et al. |
| 9,021,303 | B1* | 4/2015 | DeSouter ............ G06F 11/1417 714/15 |
| 2003/0120869 | A1 | 6/2003 | Lee et al. |
| 2003/0200388 | A1 | 10/2003 | Hetrick |
| 2005/0144514 | A1 | 6/2005 | Ulrich et al. |
| 2006/0004957 | A1 | 1/2006 | Hand et al. |
| 2007/0143359 | A1 | 6/2007 | Uppala |
| 2007/0300013 | A1* | 12/2007 | Kitamura ............ G06F 11/1474 711/114 |
| 2008/0155190 | A1 | 6/2008 | Ash et al. |
| 2009/0083478 | A1 | 3/2009 | Kunimatsu et al. |
| 2009/0132770 | A1 | 5/2009 | Yen-Chin |
| 2009/0150599 | A1 | 6/2009 | Bennett |
| 2010/0042790 | A1 | 2/2010 | Mondal et al. |
| 2010/0088296 | A1 | 4/2010 | Periyagaram et al. |
| 2010/0191713 | A1* | 7/2010 | Lomet ............... G06F 17/30362 707/704 |
| 2010/0205353 | A1* | 8/2010 | Miyamoto .......... G06F 11/1471 711/103 |
| 2011/0035548 | A1 | 2/2011 | Kimmel et al. |
| 2011/0191522 | A1 | 8/2011 | Condict et al. |
| 2011/0213928 | A1 | 9/2011 | Grube et al. |
| 2012/0151118 | A1 | 6/2012 | Flynn et al. |
| 2012/0239869 | A1 | 9/2012 | Chiueh et al. |
| 2012/0290788 | A1 | 11/2012 | Klemm et al. |
| 2012/0311246 | A1 | 12/2012 | McWilliams et al. |
| 2013/0018854 | A1 | 1/2013 | Condict |
| 2013/0138862 | A1 | 5/2013 | Motwani et al. |
| 2013/0238832 | A1 | 9/2013 | Dronamraju et al. |
| 2013/0238932 | A1 | 9/2013 | Resch |
| 2013/0268497 | A1 | 10/2013 | Baldwin et al. |
| 2013/0339629 | A1 | 12/2013 | Alexander |
| 2013/0346810 | A1 | 12/2013 | Kimmel et al. |
| 2014/0325117 | A1 | 10/2014 | Canepa et al. |
| 2015/0052315 | A1 | 2/2015 | Ghai |
| 2015/0134926 | A1* | 5/2015 | Yang .................... G06F 3/0611 711/167 |
| 2016/0004733 | A1* | 1/2016 | Cao .................... G06F 11/0709 707/755 |
| 2016/0203043 | A1* | 7/2016 | Nazari .............. G06F 17/30368 714/807 |
| 2016/0350192 | A1* | 12/2016 | Doherty ................ G06F 13/385 |
| 2017/0083535 | A1* | 3/2017 | Marchukov ....... G06F 17/30144 |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Leventhal, Adam H., "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the $13^{th}$ ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

TRANSACTION LOG LAYOUT FOR EFFICIENT RECLAMATION AND RECOVERY

RELATED APPLICATIONS

The present application is a divisional of U.S. patent application Ser. No. 14/872,793, entitled "Transaction Log Layout for Efficient Reclamation and Recovery", filed by Srinath Krishnamachari et al. on Oct. 1, 2015, the contents of which are hereby incorporated by reference.

BACKGROUND

Technical Field

The present disclosure relates to storage systems and, more specifically, to a layout of a transaction log that enables efficient logging of metadata into entries of the log in a storage system, as well as efficient reclamation and recovery of the log entries.

Background Information

A plurality of storage systems may be interconnected as a cluster and configured to provide storage service relating to the organization of storage containers stored on storage devices, such as disks, coupled to the systems. The storage system cluster may be further configured to operate according to a client/server model of information delivery to thereby allow one or more clients (hosts) to access the storage containers. The disks may be embodied as solid-state drives (SSDs), such as flash storage devices, whereas the storage containers may be embodied as files or logical units (LUNs). Each storage container may be implemented as a set of data structures, such as data blocks that store data for the storage container and metadata blocks that describe the data of the storage container. For example, the metadata may describe, e.g., identify, locations of the data throughout the cluster.

The metadata may be organized and processed as one or more data structures, wherein processing of the metadata involves execution of operations that modify the data structures. Modifications or changes to the metadata of the data structures typically require access to resources of the storage system, such as central processing units (CPUs) and logs that store the metadata. As such, it is desirable that the modifications to the metadata be processed efficiently in the logs. In addition, it is desirable that the metadata be quickly re-playable, so as to support fast and efficient recovery of the storage service.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
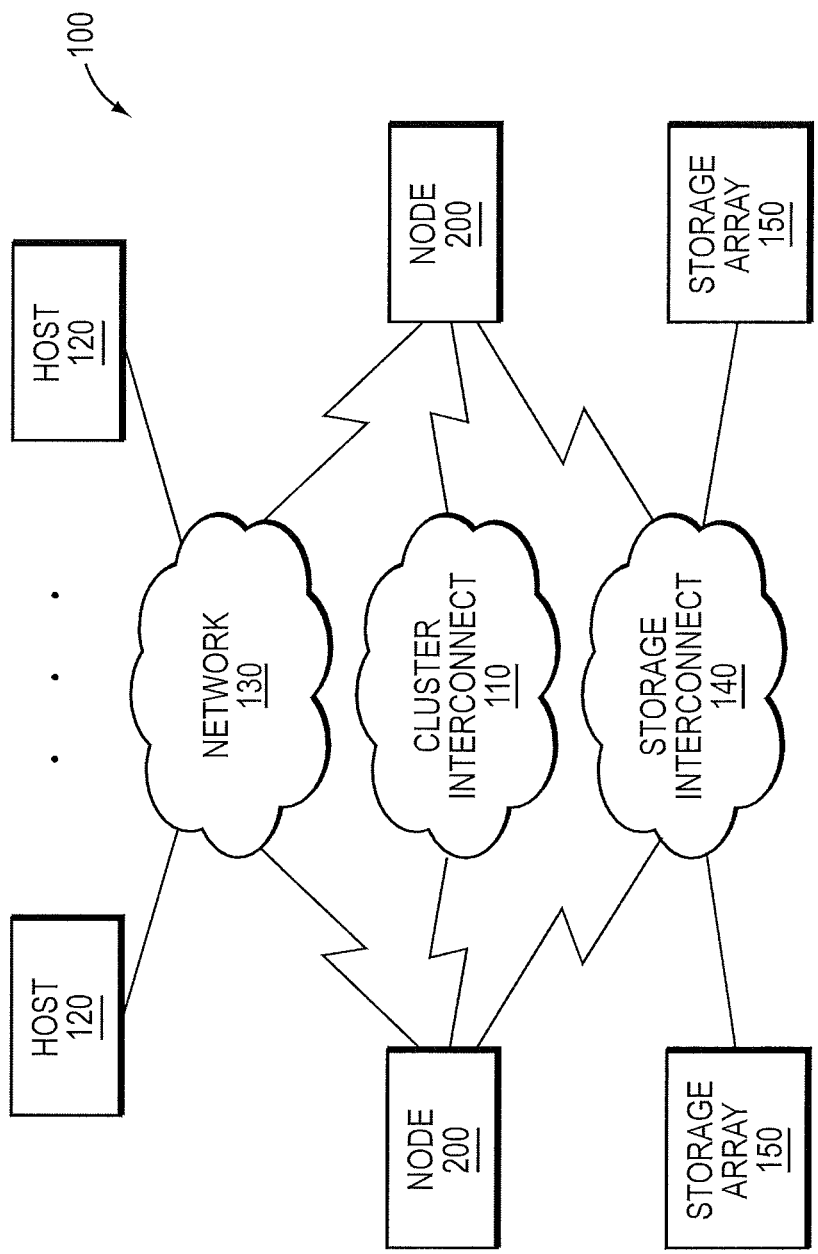
FIG. 1 is a block diagram of a plurality of nodes interconnected as a cluster.

The embodiments herein are directed to a layout of a transaction log that enables efficient logging of metadata into entries of the log, as well as efficient reclamation and recovery of the log entries by a volume layer of a storage input/output (I/O) stack executing on one or more nodes of a cluster. The transaction log is illustratively a two stage, append-only logging structure, wherein the first stage is non-volatile random access memory (NVRAM) embodied as a NVlog and the second stage is disk, e.g., solid state drive (SSD). When the NVlog is full, the metadata may be flushed (written) to SSD as one or more extents. As described herein, the layout of the logging structure facilitates steady-state logging of metadata managed by the volume layer and facilitates crash recovery. Steady-state logging of metadata into the log entries occurs while the storage I/O stack of a node actively processes I/O requests, while crash recovery of the log entries occurs after an unexpected shutdown of the node.

In an embodiment, the metadata managed by the volume layer, i.e., the volume metadata, is illustratively embodied as mappings from addresses, i.e., logical block addresses (LBAs), of a logical unit (LUN) accessible by a host to durable extent keys. The volume layer organizes the volume metadata as one or more multi-level dense tree structures, wherein each level of the dense tree includes volume metadata entries for storing the volume metadata mappings. Operations on the volume metadata managed by the volume layer manifest as modifications or changes to metadata entries of various data structures, including the NVLog and dense tree structure, at offset ranges of the regions. Moreover, the operations (i.e., offset range operations) directed to the regions are illustratively processed by threads of execution, i.e., uniprocessor (UP) services, on central processing units (CPUs) of the nodes.

Illustratively, the NVRAM is organized as a plurality of circular logs, e.g., implemented as a plurality of NVlog buckets, each having one or more log entries appearing virtually as a continuous log. Further, each NVlog bucket may be associated with a different UP service to facilitate lockless concurrent operations to the respective bucket thereby, e.g., rendering direct memory access (DMA) operations "lockless." The volume layer arranges the log entries for each bucket into groups of transactions organized by indivisible classes of operation, such as a dense tree merge operation, a delete operation, an insert operation, and a recovery operation. Each class of operation is associated with a finite state machine (FSM) to process the transactions for that class and ensure atomicity for each processed transaction. Further, each class of operation may require a different amount of NVRAM resources (i.e., log space) such that concurrent operation of certain mixes of class operations may exhaust available NVRAM resources. Accordingly, quota pools are employed to provide logical pools of NVRAM log space, allocated to an FSM, so as to process the transactions for a given class of operations. When started, an FSM may be allocated a quota pool of sufficient size (i.e., an expected amount of NVRAM) to support the log entries for the class of operation associated with that FSM. If the pool is not available, the FSM is queued, e.g., to avoid deadlock, until such a pool (or sufficient amount of resource) is available.

In an embodiment, a physical layout or format is provided for the log entries that includes, inter alia, sequence numbers and error correction codes (e.g., CRCs), as well as descriptions of the log entries that include token identifiers (IDs) for identifying the FSMs associated with each entry. As log entries are processed by the FSMs, a high watermark (i.e., threshold) for the quota pools is used to terminate (e.g., forcefully close) long running FSMs that prevent reclamation of log space (i.e., log entries). In-memory shadow data structures are also employed to manage outstanding token IDs (FSMs), as well as to manage log space reclamation by, e.g., queuing those log entries that have not yet been reclaimed.

For crash recovery, the volume layer performs a DMA read operation to load the NVlog buckets into main memory of the node. For each bucket, headers and footers of the log entries are examined for consistency, and the log entries are scanned to recover token IDs and identify those entries that are active. The log entries are then walked from oldest to newest (using sequence numbers) searching for the highest sequence number. Any log entries (operations) associated with FSMs that have completed are discarded, leaving the set of log entries (and associated FSMs) that are active and, thus, require replay. Partially complete log entries (e.g., log entries in-progress when a crash occurs) may be discarded for failing a checksum (e.g., a CRC error). Old value/new value (OV/NV) logs may be used to implement roll-forward or roll-back semantics to replay the log entries and fix any on-disk data structures. Specifically, the OV/NV logs are used to copy old content of volume metadata or new content of volume metadata as appropriate, first from NVRAM and then from on-disk logs. Based on the context of a FSM that crashed, an extent may be patched-up (repaired) using either the old copy or new copy of volume metadata.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
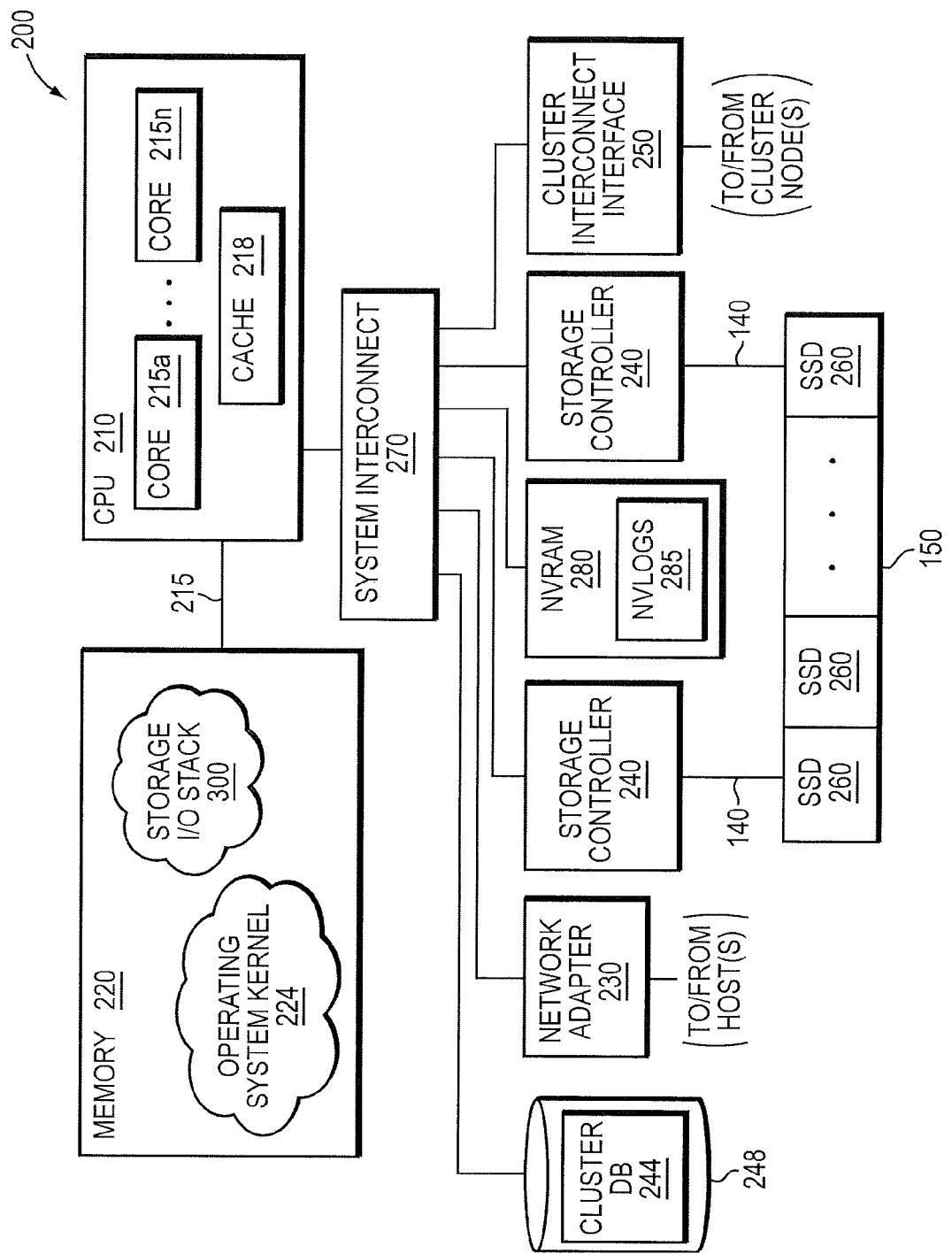
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU (i.e., CPU socket) 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU socket 210 may, in turn, include processing elements and/or logic circuitry configured to execute the software programs, such as a storage input/output (I/O) stack 300, and manipulate the data structures. The processing elements and/or logic circuitry may include processor (CPU) cores 215*a*-*n* and a shared cache (e.g., a last level cache) 218. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
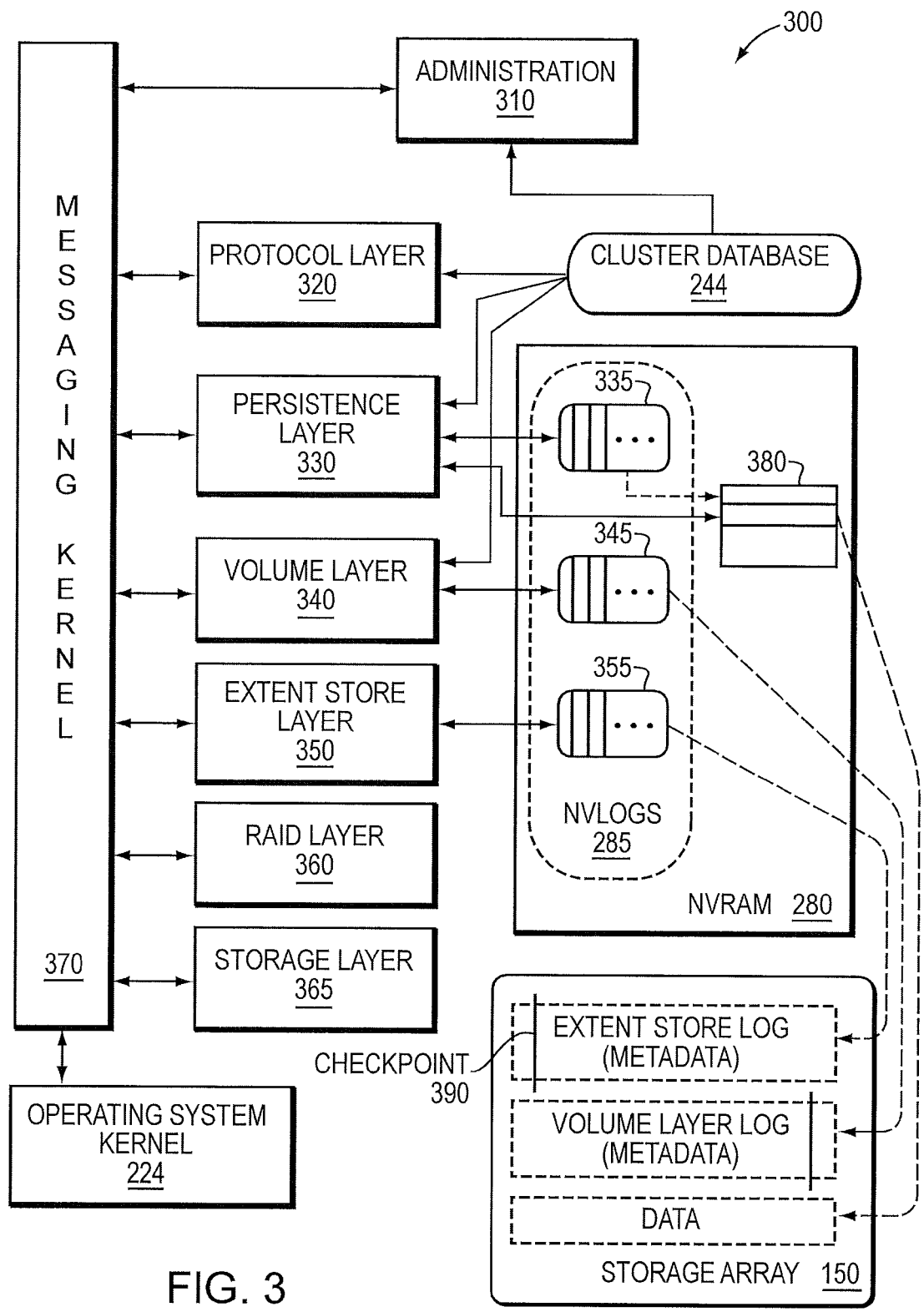
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA0 (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic, or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
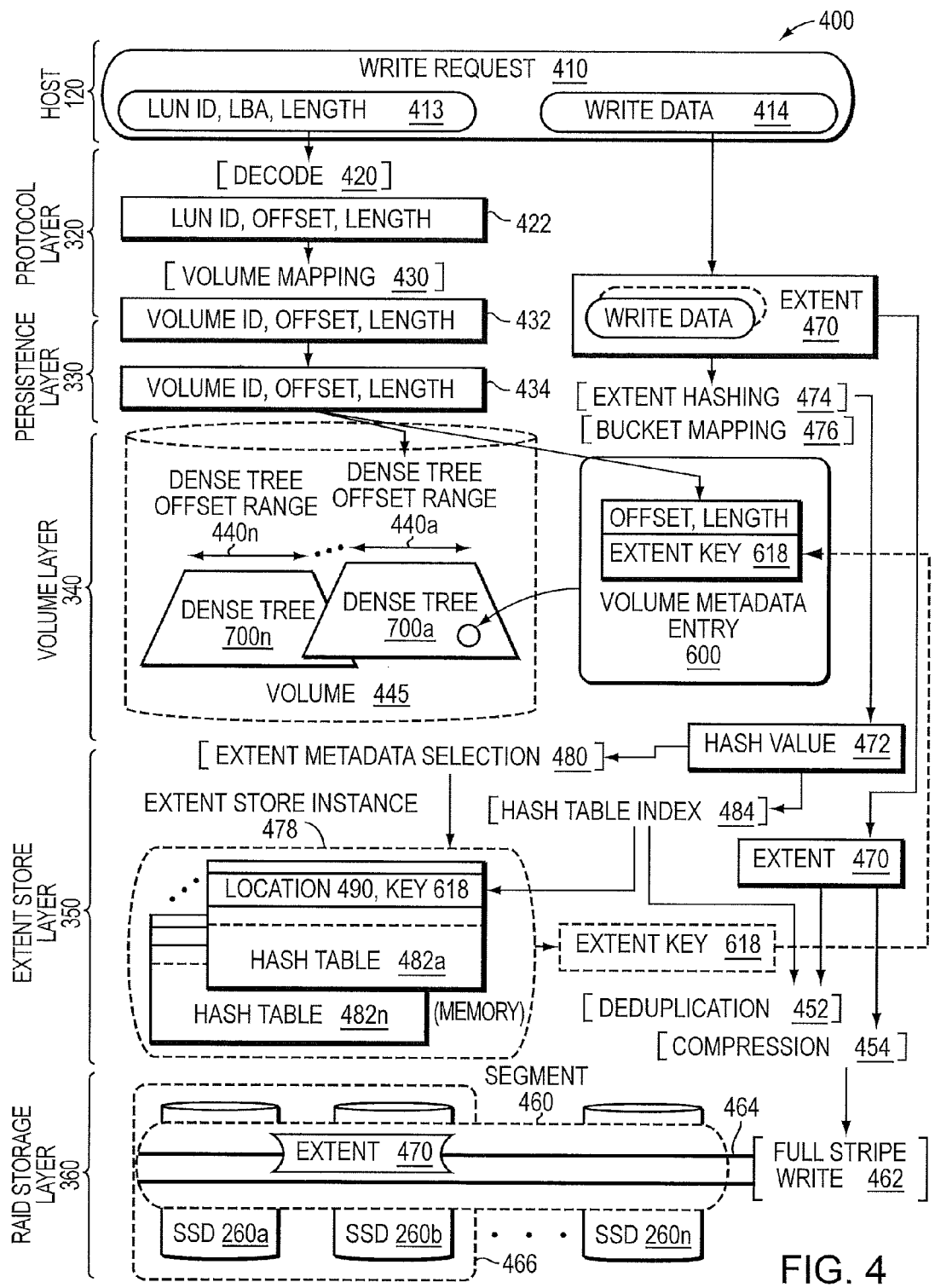
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer log 335, which records the request in the persistent layer log 330, and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
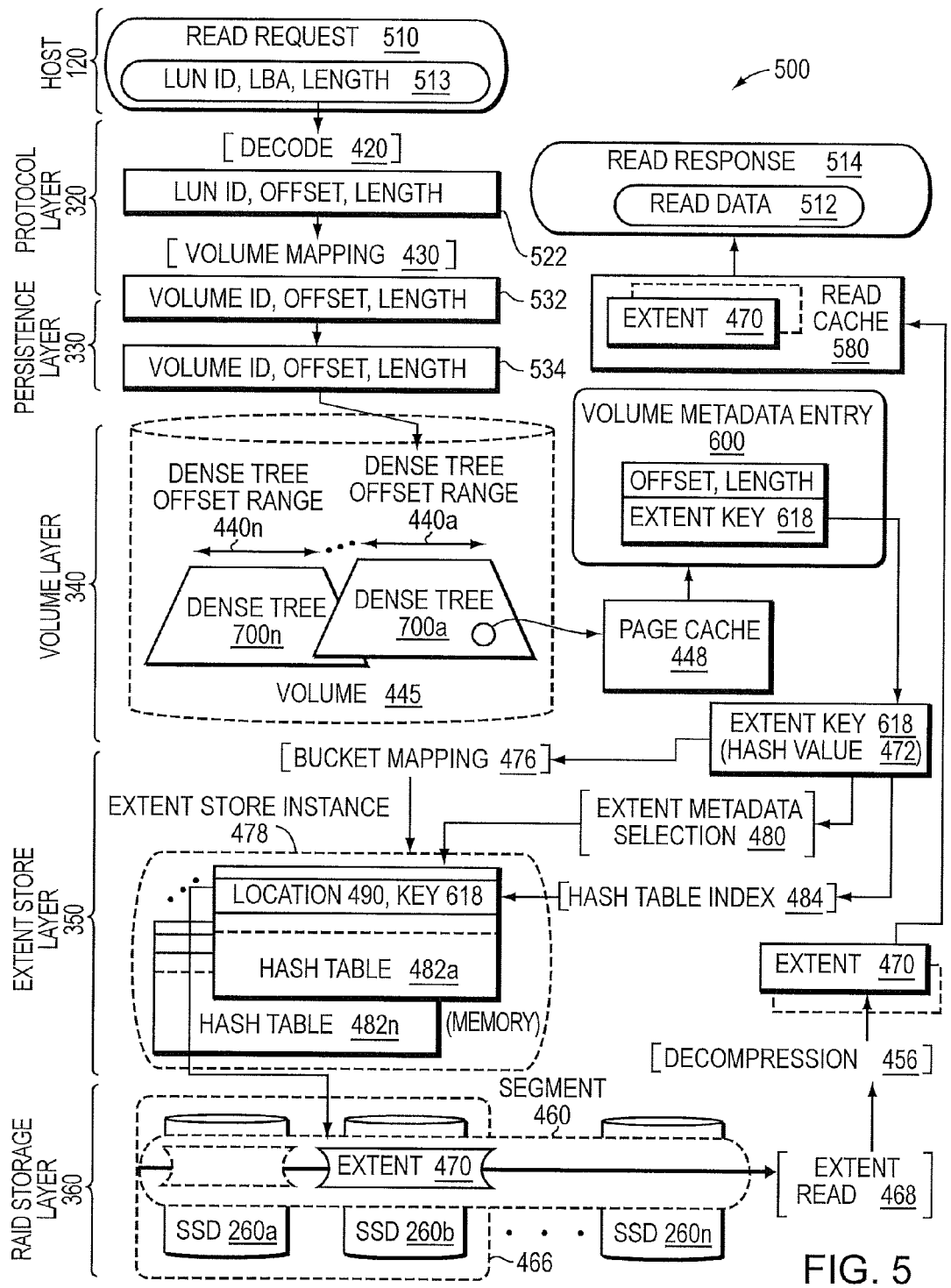
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 700*a*) associated with a region (e.g., offset range 440*a*) of a volume 445 that encompasses the requested offset range (specified by parameters 534). The volume layer instance may further process the read request to search for (lookup) one or more volume metadata entries 600 of the dense tree 700*a* to obtain one or more extent keys 618 associated with one or more extents 470 within the requested offset range. As described further herein, each dense tree 700 may be embodied as a multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482*a*) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260*b*). The extent store instance then cooperates with the RAID storage layer 360 to access the extent on SSD 260*b* and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, LUN data (user data) stored as extents is (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
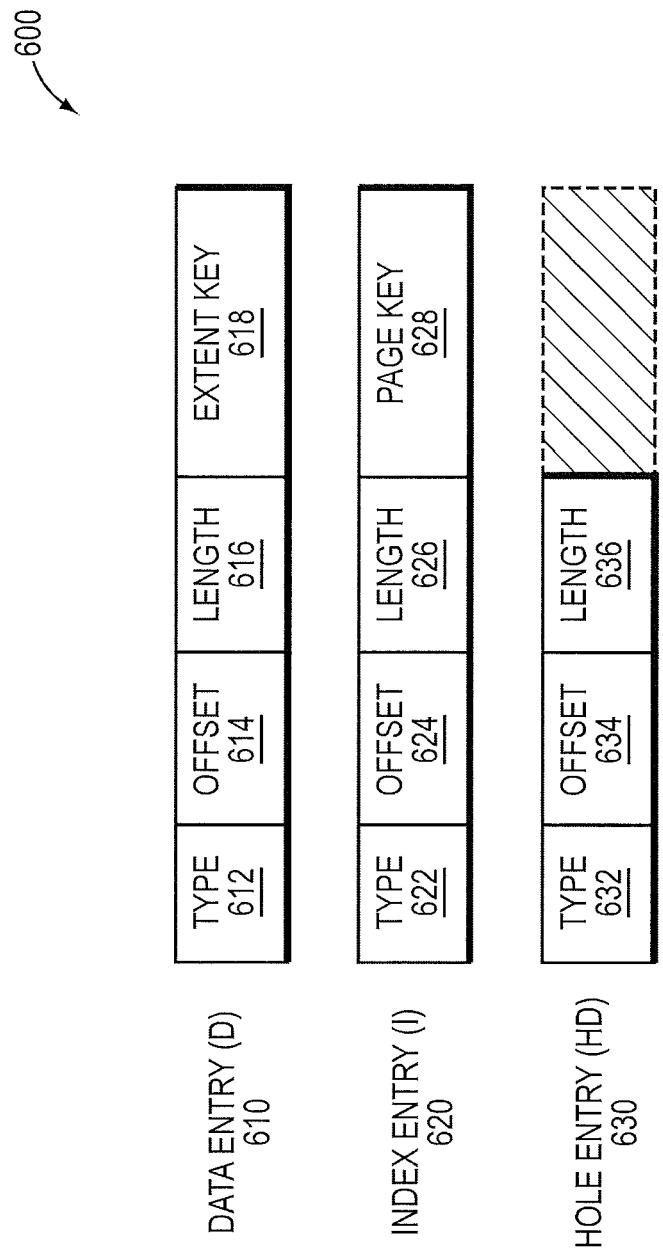
FIG. 6 is a block diagram of various volume metadata entries.

FIG. 6 is a block diagram of various volume metadata entries 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

In an embodiment, the volume metadata entry types are of a fixed size (e.g., 12 bytes including a type field of 1 byte, an offset of 4 bytes, a length of 1 byte, and a key of 6 bytes) to facilitate search of the dense tree metadata structure as well as storage on metadata pages. Thus, some types may have unused portions, e.g., the hole entry 630 includes less information than the data entry 610 and so may have one or more unused bytes. In an alternative embodiment, the entries may be variable in size to avoid unused bytes. Advantageously, the volume metadata entries may be sized for in-core space efficiency (as well as alignment on metadata pages), which improves both read and write amplification for operations. For example, the length field (616, 626, 636) of the various volume metadata entry types may represent a unit of sector size, such as 512 bytes or 520 bytes, such that a 1 byte length may represent a range of 255×512 bytes=128K bytes.

Figure 7:
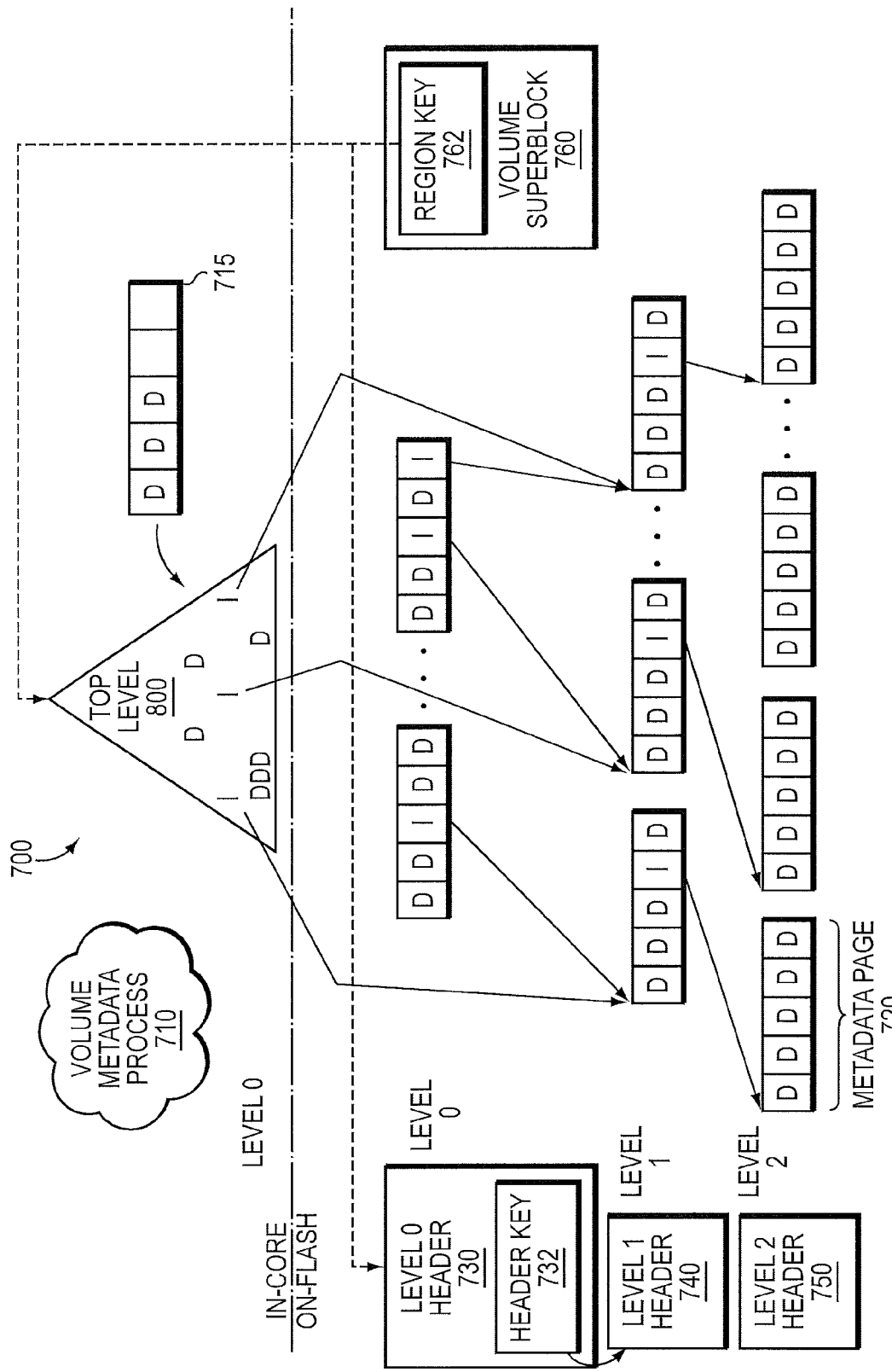
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. Each metadata page 720 has a unique identifier (ID), which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
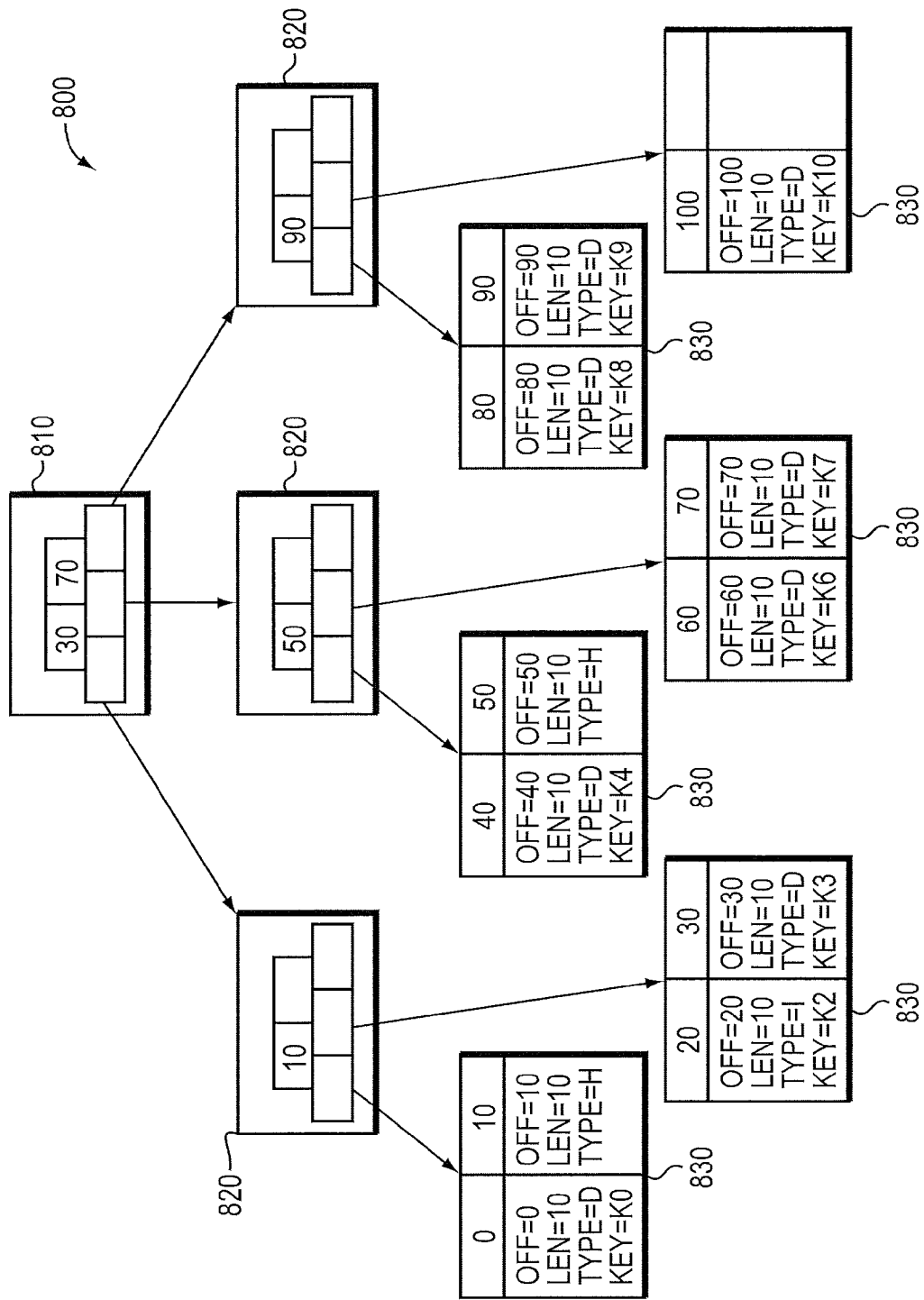
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search, in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) of metadata from SSD is required so as to reduce read amplification.

Figure 9:
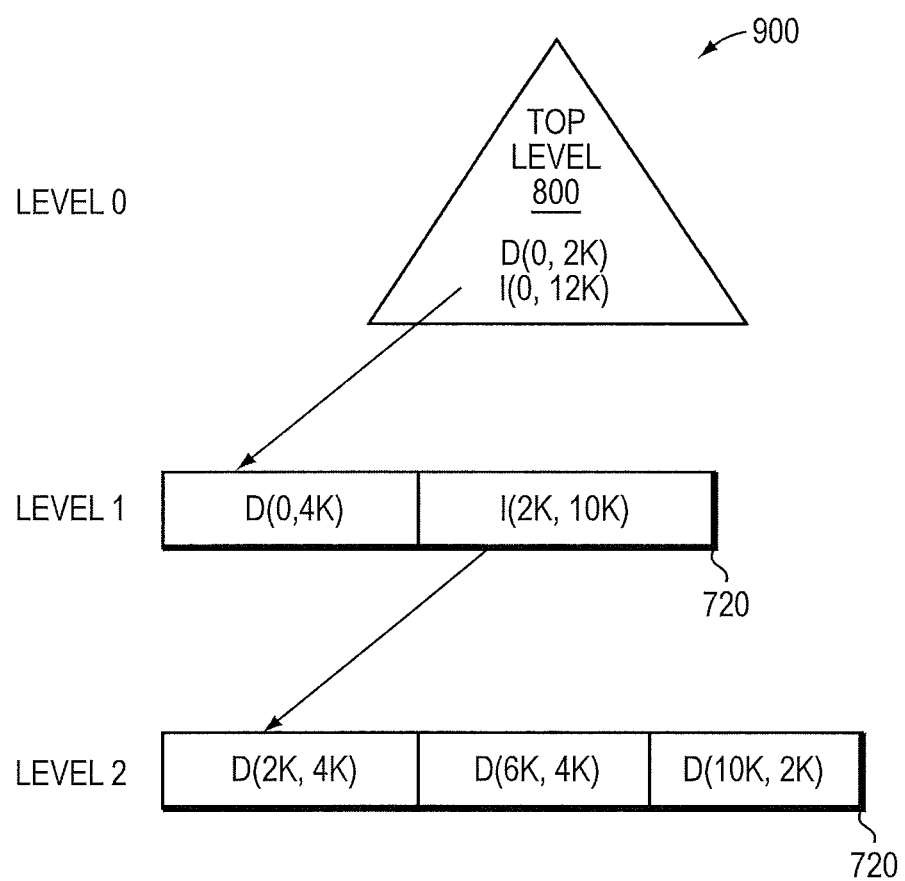
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. As noted, each volume metadata entry 600 has a fixed size, e.g., 12 bytes, such that a predetermined number of entries may be packed into each metadata page 720. The data entry (D) 610 is a map of (offset, length) to an address of (user) data which is retrievable using an extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 12K=2K+10K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
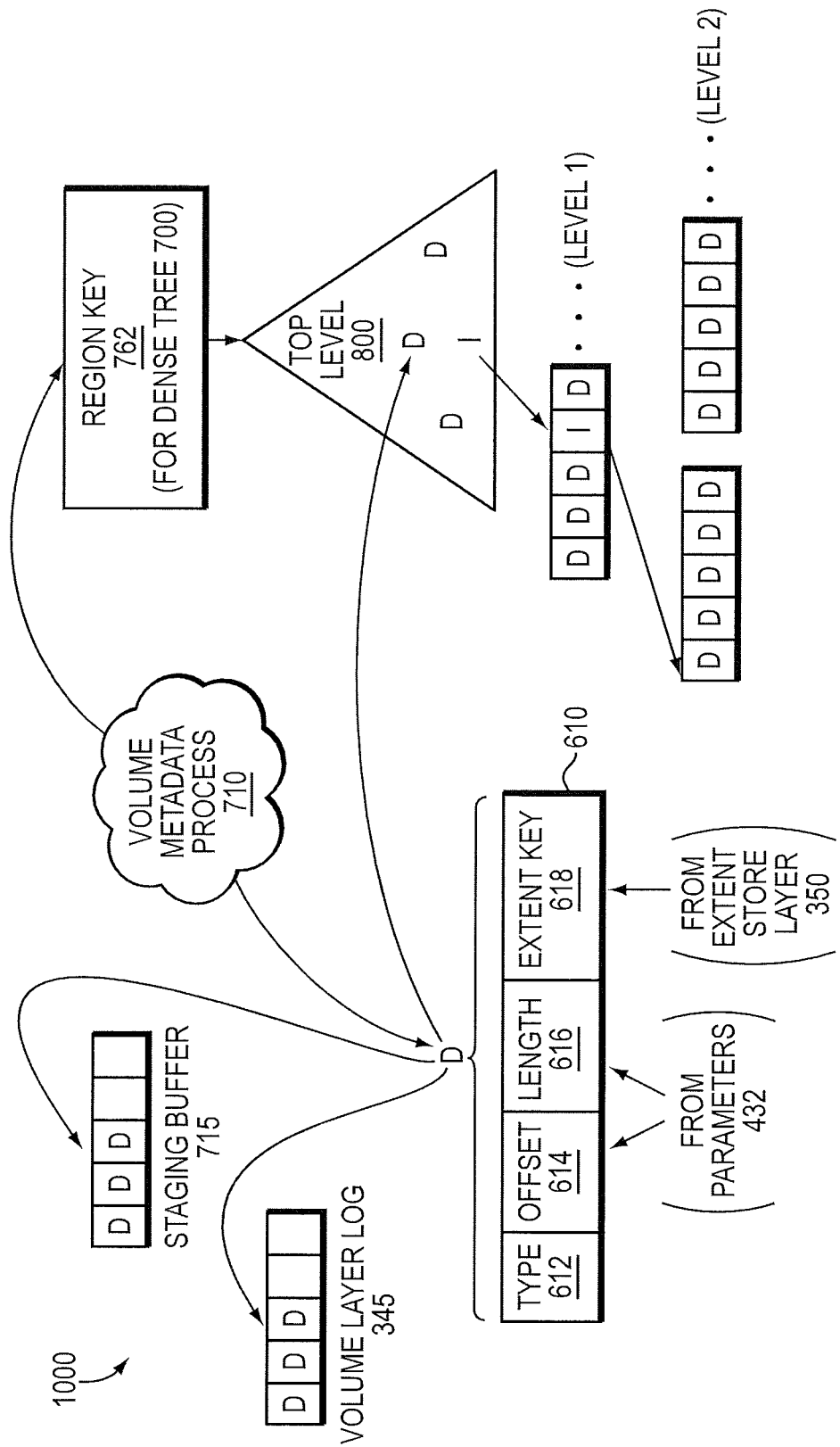
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an offset range (offset, length) an extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220.

Operationally, the volume metadata process 710 applies the region key 762 to access the dense tree 700 (i.e., top level 800) of an appropriate region (e.g., offset range 440 as determined from the parameters 432 derived from a write request 410). Upon completion of a write request, the volume metadata process 710 creates a volume metadata entry, e.g., a new data entry 610, to record a mapping of offset/length-to-extent key (i.e., offset range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D). The volume metadata process 710 then updates the volume metadata by inserting (adding) the data entry D into the level 0 staging buffer 715, as well as into the top level 800 of dense tree 700 and the volume layer log 345, thereby signifying that the write request is stored on the storage array 150.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
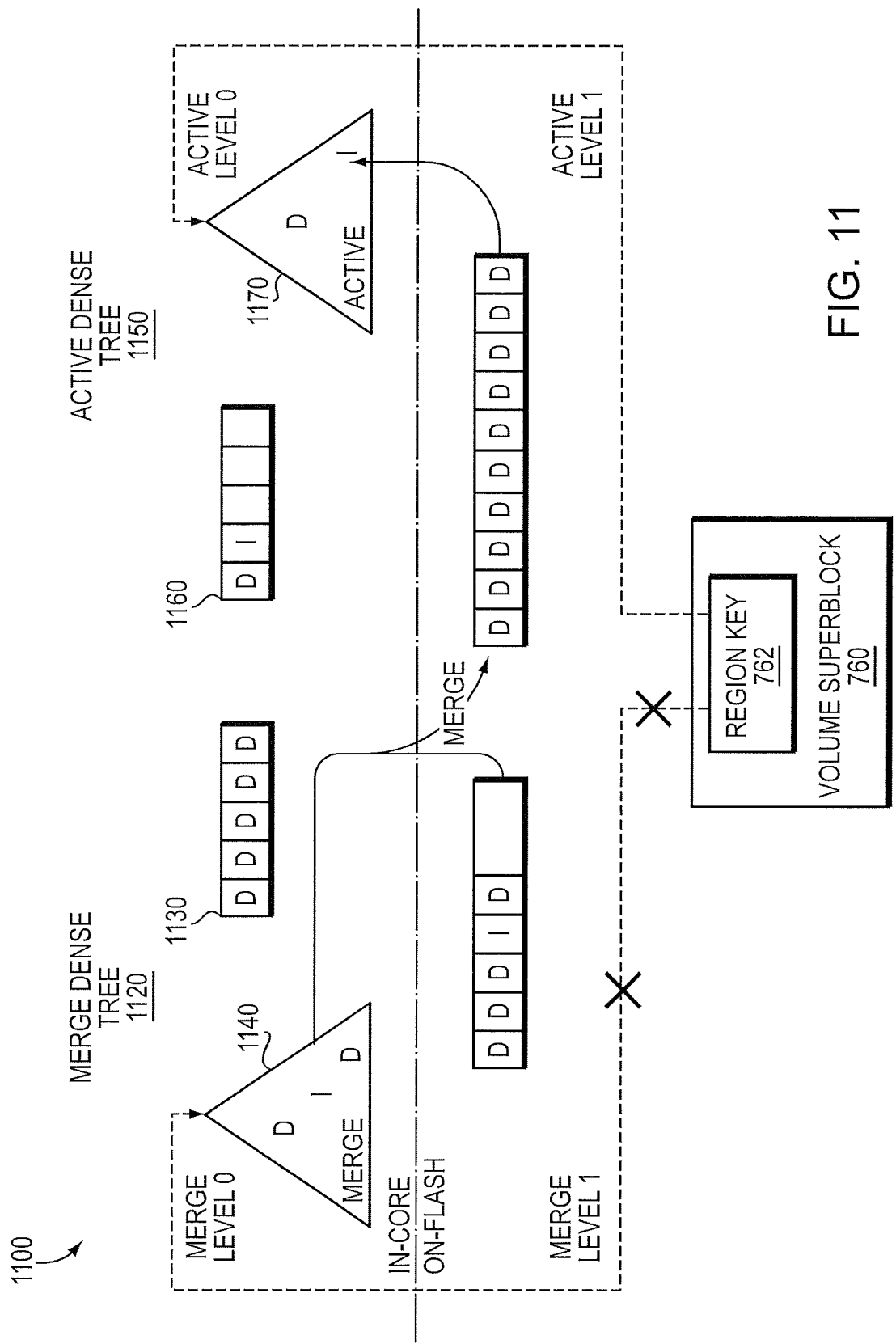
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e., active user read and write requests), while a merge staging buffer 1130 and merge top level 1140 of merge dense tree 1120 handle consistency of the data during a merge operation. That is, a "double buffer" arrangement may be used to handle the merge of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 (and the top level 1140 of the dense tree) thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Figure 12:
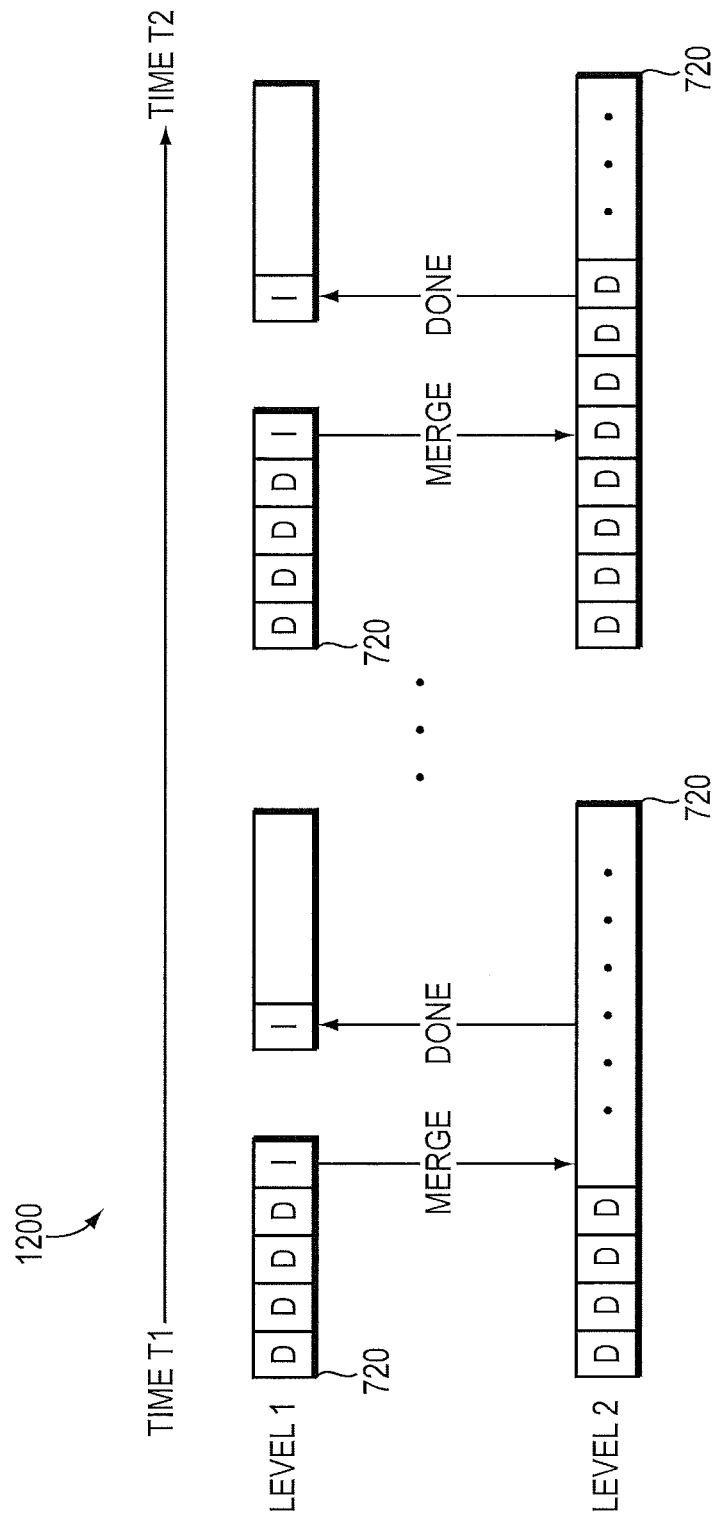
FIG. 12 illustrates batch updating between levels of the dense tree metadata structure.

FIG. 12 illustrates batch updating 1200 between lower levels, e.g., levels 1 and 2, of the dense tree metadata structure. Illustratively, as an example, a metadata page 720 of level 1 includes four data entries D and an index entry I referencing a metadata page 720 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Figure 13:
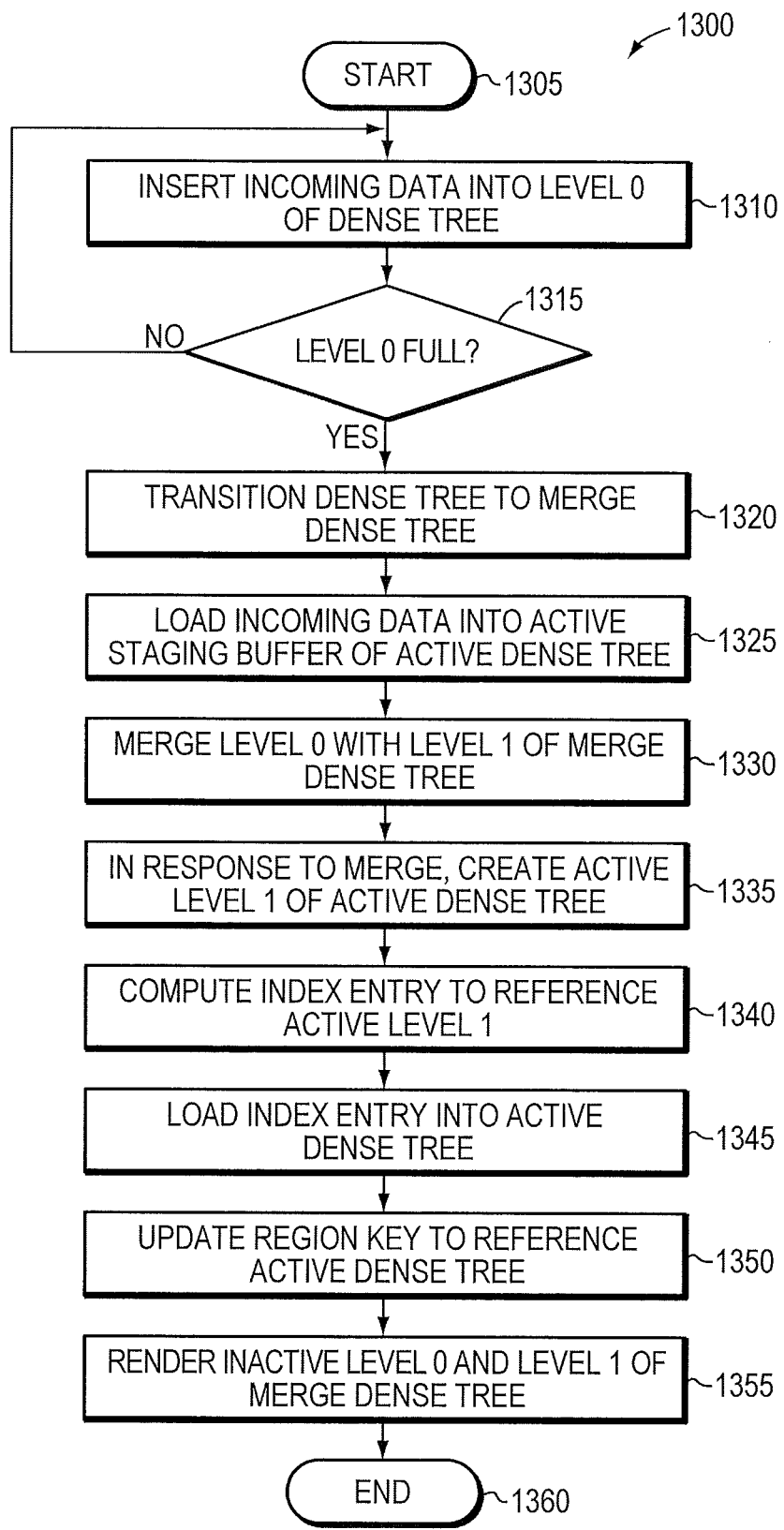
FIG. 13 is an example simplified procedure for merging between levels of the dense tree metadata structure.

FIG. 13 is an example simplified procedure 1300 for merging between levels of the dense tree metadata structure. The procedure starts at step 1305 and proceeds to step 1310 where incoming data received at the dense tree metadata structure is inserted into level 0, i.e., top level 800, of the dense tree. Note that the incoming data is inserted into the top level 800 as a volume metadata entry. At step 1315, a determination is made as whether level 0, i.e., top level 800, of the dense tree is rendered full. If not, the procedure returns to step 1310; otherwise, if the level 0 is full, the dense tree transitions to a merge dense tree structure at step 1320. At step 1325, incoming data is loaded into an active staging buffer of an active dense tree structure and, at step 1330, the level 0 merges with level 1 of the merge dense tree structure. In response to the merge, a new active level 1 is created for the active dense tree structure at step 1335. At step 1340, an index entry is computed to reference the new active level 1 and, at step 1345, the index entry is loaded into the active dense tree structure. At step 1350, a region key of a volume superblock is updated to reference the active dense tree structure and, at step 1355, the level 0 and level 1 of the merge dense tree structure are rendered inactive (alternatively, deleted). The procedure then ends at step 1360.

In an embodiment, as the dense tree fills up, the volume metadata is written out to one or more files on SSD in a sequential format, independent of when the volume layer log 345 is de-staged and written to SSD 260, i.e., logging operations may be independent of merge operations. When writing volume metadata from memory 220 to SSD, direct pointers to the data, e.g., in-core references to memory locations, may be replaced with pointers to an index block in the file that references a location where the metadata can be found. As the files are accumulated, they are illustratively merged together in a log-structured manner that continually writes the metadata sequentially to SSD. As a result, the lower level files grow and contain volume metadata that may be outdated because updates have occurred to the metadata, e.g., newer entries in the dense tree may overlay older entries, such as a hole entry overlaying an underlying data entry. The updates (i.e., layered LBA ranges) are "folded" into the lower levels, thereby overwriting the outdated metadata. The resulting dense tree structure thus includes newly written metadata and "holes" where outdated metadata has been deleted.

Dense Tree Volume Metadata Logging

In an embodiment, the volume layer log 345 is a two level, append-only logging structure, wherein the first level is NVRAM 280 (embodied as NVLogs 285) and the second level is SSD 260, e.g., stored as extents. New volume metadata entries 600 inserted into level 0 of the dense tree are also recorded in the volume layer log 345 of NVLogs 285. When there are sufficient entries in the volume layer log 345, e.g., when the log 345 is full or exceeds a threshold, the volume metadata entries are flushed (written) from log 345 (i.e., from NVRAM) to SSD 260 as one or more extents 470. Multiple extents may be linked together with the volume superblock 760 holding a key (i.e., an extent key) to the head of the list. In the case of recovery, the volume layer log 345 is read back to memory 220 to reconstruct the in-core top level 800 (i.e., level 0) of dense tree 700. Other levels may be demand paged via the page cache 448, e.g., metadata pages of level 1 are loaded and read as needed.

Figure 14:
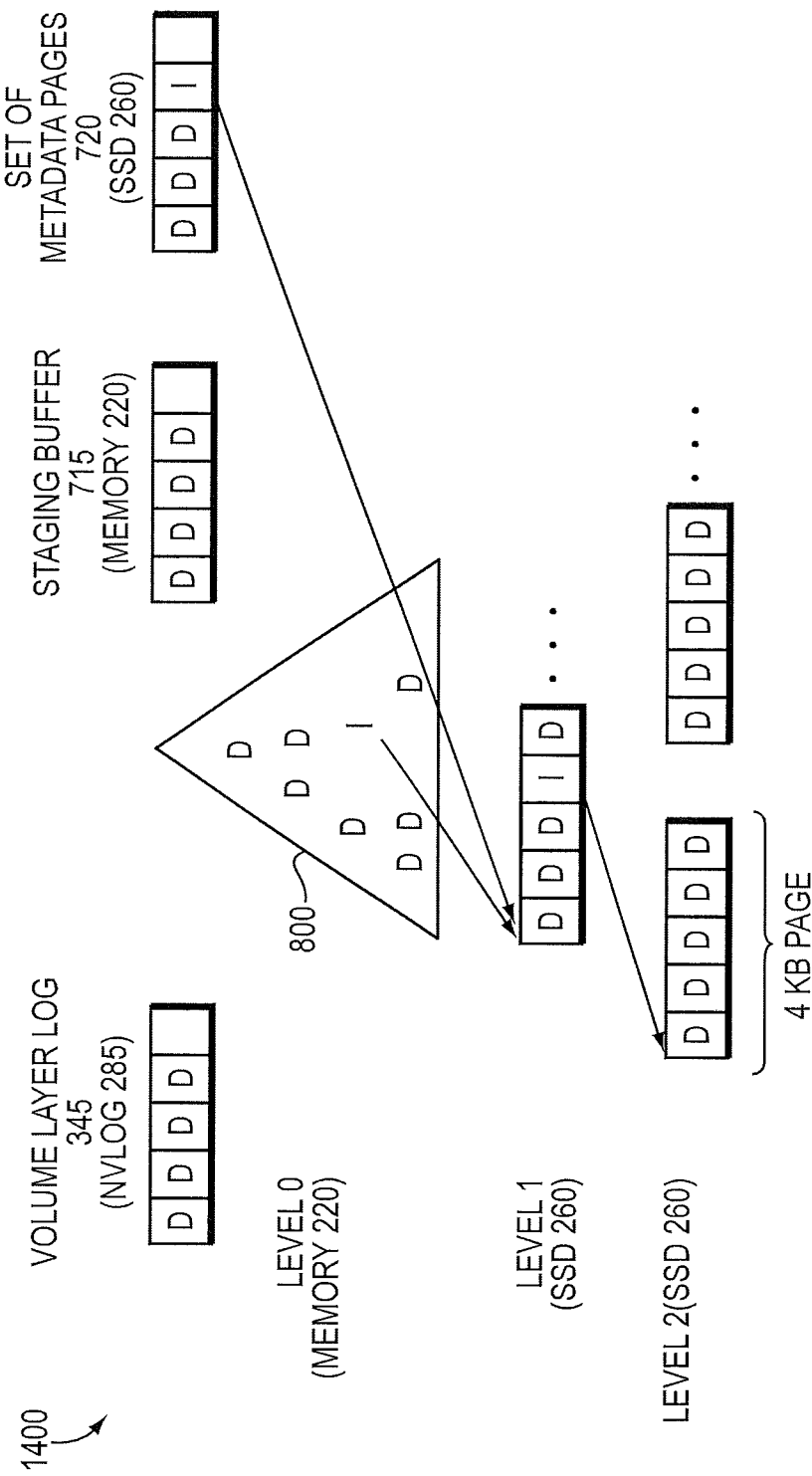
FIG. 14 illustrates volume logging of the dense tree metadata structure.

FIG. 14 illustrates volume logging 1400 of the dense tree metadata structure. Copies of the volume metadata entries 600 stored in level 0 of the dense tree are maintained in persistent storage (SSD 260) and recorded as volume layer log 345 in, e.g., NVLogs 285. Specifically, the entries of level 0 are stored in the in-core staging buffer 715, logged in the append log (volume layer log 345) of NVLogs 285 and thereafter flushed to SSD 260 as a set of metadata pages 720. Copies of the level 0 volume metadata are maintained in-core as the active dense tree level 0 so as to service incoming read requests from memory 220. Illustratively, the in-core top level 800 (e.g., active dense tree level 0 1170) may be used as a cache (for hot metadata), whereas the volume metadata stored on the other lower levels of the dense tree are accessed less frequently (cold data) and maintained on SSD. Alternatively, the lower levels also may be cached using the page cache 448.

Transaction Log Layout

The embodiments herein are directed to a layout of a transaction log that enables efficient logging of metadata into entries of the log, as well as efficient reclamation and recovery of the log entries by the volume layer. As previously noted, the transaction log is illustratively a two stage, append-only logging structure of the NVlogs and SSD. The layout of the logging structure (e.g., the volume layer log) facilitates steady-state logging of metadata, e.g., in response to write requests, managed by the volume layer and facilitates crash recovery. Steady-state logging of metadata into the log entries occurs while the storage I/O stack of a node actively processes host-initiated I/O requests (e.g., write request 410 and read request 510), while crash recovery of the log entries occurs after an unexpected shutdown of the node. Notably, the steady-state logging may be configured for efficient operation at the expense of a more complex crash recovery.

Figure 15:
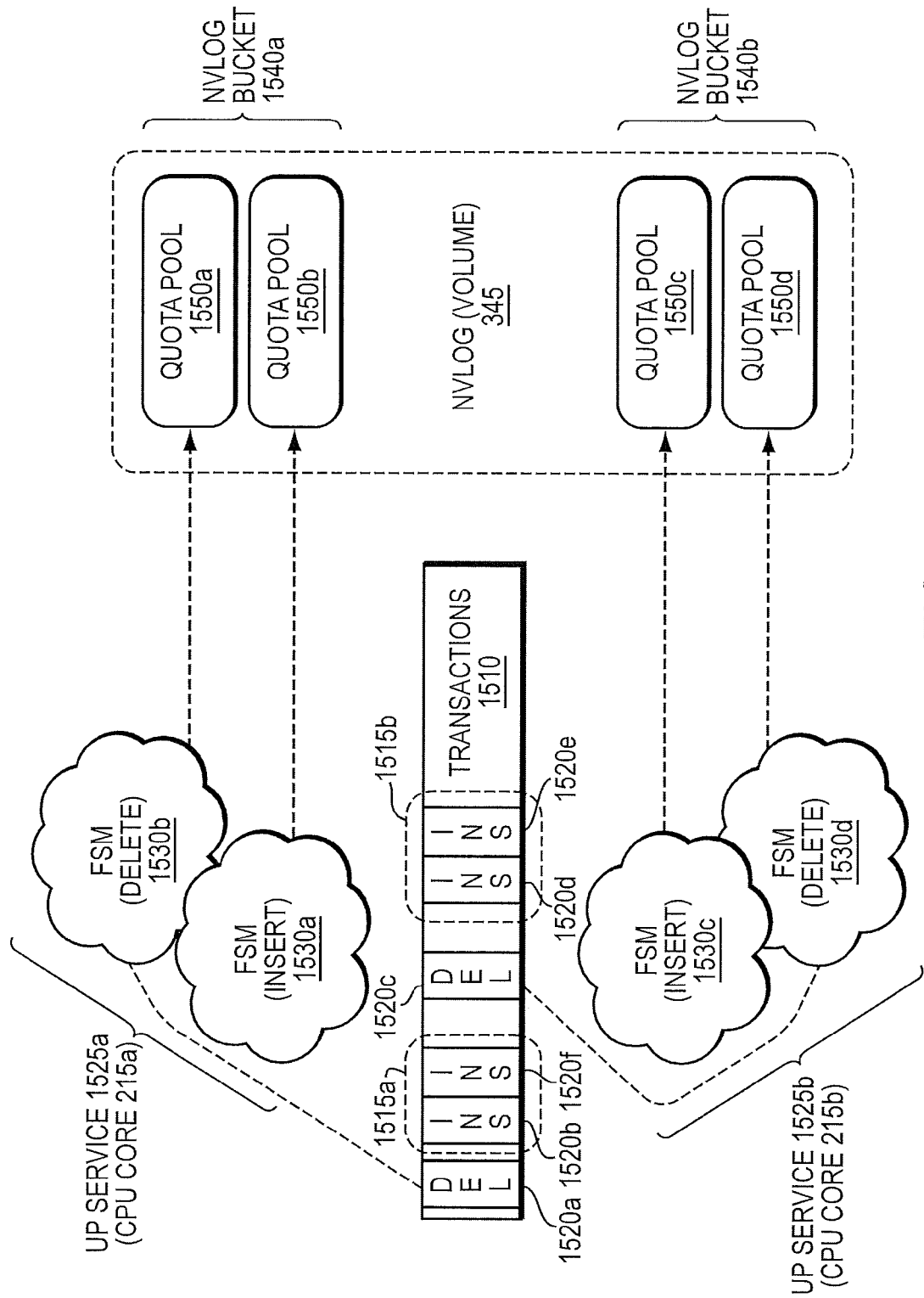
FIG. 15 illustrates logging in the volume layer of the storage I/O stack.

FIG. 15 illustrates logging in the volume layer of the storage I/O stack. In an embodiment, the volume layer log (i.e., NVlog 345) is organized as a plurality of circular logs implemented as one or more NVlog buckets 1540a,b having log entries. Each NVlog bucket 1540a,b may be associated with a different thread of execution, e.g., a uniprocessor (UP) service 1525a,b executed on a CPU core 215a,b, to facilitate lockless concurrent operations to the respective bucket. A volume striping technique by region (based on offset range 440a-n) may be employed that increases concurrency of execution directed to the metadata (e.g., volume metadata entries 600), while reducing contention among resources of one or more nodes 200 of the cluster. As noted, operations on the metadata managed by the volume layer manifest as modifications or changes to metadata entries of various data structures, including the NVLogs and dense tree structures, at offset ranges 440a-n of the regions (embodied as dense trees 700a-n). Moreover, the operations (i.e., offset range operations) directed to the regions are illustratively processed by the UP services 1525a,b executing on CPUs (i.e., CPU cores 215a,b) of the nodes.

In an embodiment, the number of NVlog buckets 1540a,b in the volume layer is the same as the number of UP services 1525a,b (i.e., one-to-one correspondence of UP services 1525a,b to NVlog buckets 1540a,b) to thereby enable lockless operation among the NVlog buckets, i.e., DMA write/read requests to/from the NVlog buckets in NVRAM. That is, each volume UP service has an associated NVlog bucket which renders DMA operations lockless from the volume layer perspective. Illustratively, a single NVRAM channel may be used, such that from the volume layer (i.e., DMA client) perspective, each UP service has its own NVlog bucket which avoids lock contention among the logs in NVRAM. In other words, the DMA clients (i.e., UP services) need not expressly handle contention among themselves, however locking may occur within an NVRAM driver shared by those DMA clients. Such arrangement also enables a recovery mechanism to be lockless; i.e., recovery may be performed on individual NVlog buckets concurrently (i.e., without locking synchronization requirements between the buckets).

The volume layer may arrange transactions 1510 associated with each bucket into is groups 1515a,b of transactions organized by indivisible class of operations such as, e.g., a dense tree merge operation (not shown), a delete operation 1520a,c, an insert operation 1520b,d,e, f, and a recovery operation (not shown). Each class of operation may be associated with a finite state machine (FSM) 1530a-d to process the transactions for that class and ensure atomicity. Illustratively, FSM processing of transactions for each operation generates log entries to the associated NVlog bucket. Effectively each FSM may act as a storage operation state machine that stores results of the transactions while consuming log entries (i.e., resources of the NVlogs) of the associated NVlog bucket. Results of a transaction may include an NVlog bucket entry stored to SSD (e.g., an insert transaction) or an object stored to SSD (e.g., a merge of level 0 to level 1 of the dense tree). Illustratively, a terminal state of the FSM processing a transaction is storage to SSD of the results of that transaction, so that NVlog bucket entries consumed by the FSM during processing of the transaction may be reclaimed.

A group 1515b of one or more transactions 1520d,e may be associated atomically (e.g., insertion of volume data entries 610 included in a metadata page 720) with an FSM 1530. That is, transactions 1520d,e having a same class of operation (e.g., insert) may be grouped according to metadata pages 720 which are stored to SSD. Accordingly, each group 1515b of entries 1520d,e or single entries 1520a,c may be tracked by a different FSM 1530a-d. That is, an FSM may track (i.e., manage) state transitions for a group of entries until that group is persisted on-disk (i.e., terminal state of the FSM for the group of transactions or transaction). Each group (or single transaction) may be illustratively identified by a token identifier (ID) that also identifies the associated FSM. Notably, an NVlog bucket 1540a may be associated with multiple FSMs 1530a,b, each processing a different class of operation. Accordingly, the NVlog bucket may include entries from multiple different active (i.e., outstanding transactions) FSMs.

In an embodiment, quota pools 1550a-d are employed to provide logical pools of log space in NVRAM (i.e., NVlog bucket resources) for an FSM. When started, an FSM may be allocated a quota pool of sufficient size to support a number of log entries expected for the class of operation associated with that FSM. Illustratively, if the pool is not available, the FSM is queued, e.g., to avoid deadlock, until such a pool (or resource) is available. The quota pool may be allocated based on a maximum calculated size for the class of operation (e.g., a merge of dense tree level 0 with level 1, each with predetermined sizes). As log entries are processed by the FSMs, a high watermark (e.g., 70%) for the quota pools is used to forcefully close (or terminate) certain FSMs that have a total size of entries in the quota pool exceeding the high watermark, which would otherwise prevent reclamation of log space (i.e., log entries). Further, in-memory shadow data structures (not shown) may be also employed to manage outstanding token IDs (i.e., entries in-process by the FSMs), as well as to manage log space reclamation by, e.g., queuing log entries that have not yet been reclaimed. Illustratively, the log space is managed as two portions: a first portion recording (logging) entries, and a second portion having log entries being reclaimed such that log space occupied by those reclaimed entries may be re-used in the first portion.

NVLog Bucket

Figure 16:
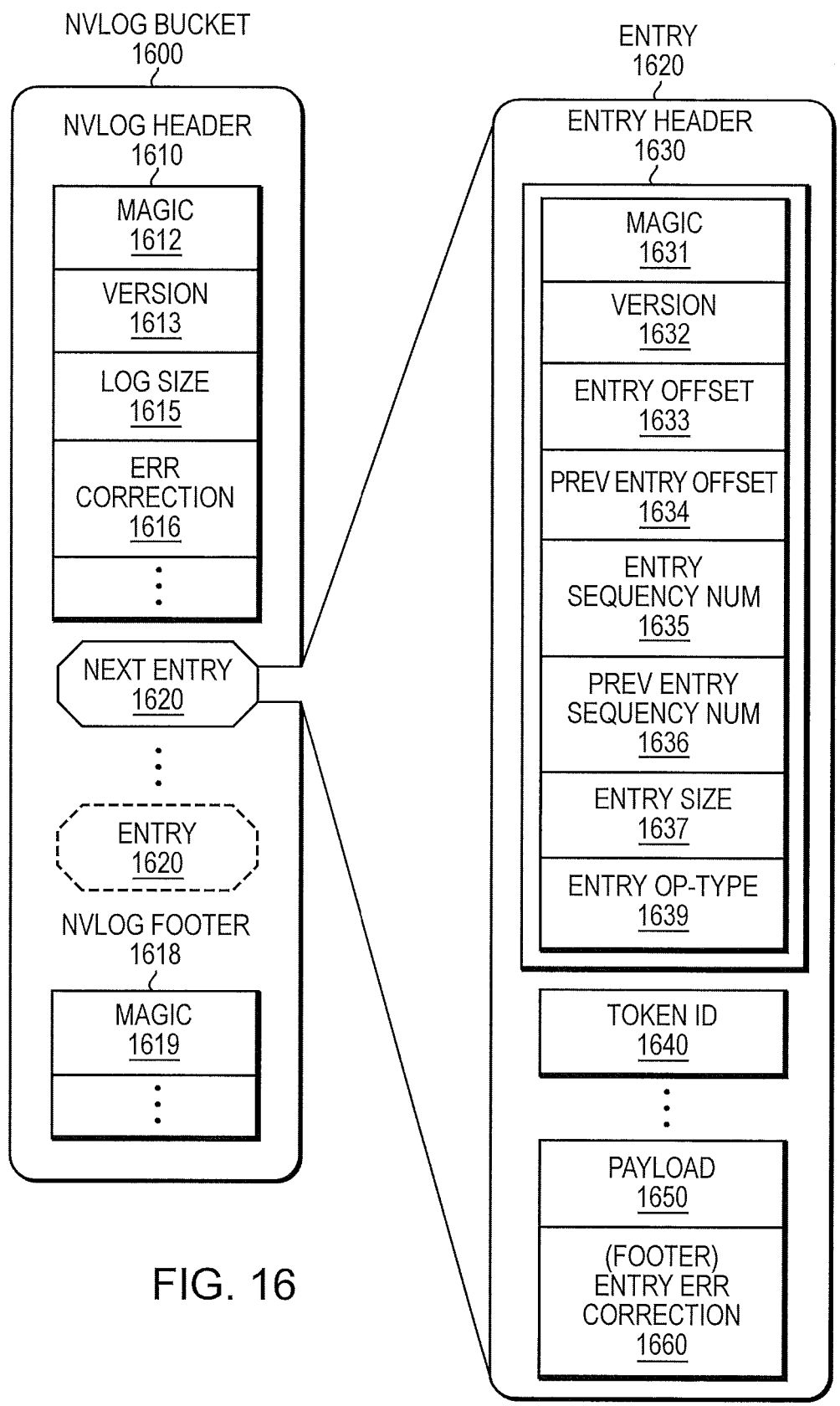
FIG. 16 is a block diagram of the volume layer log format of the storage I/O stack.

FIG. 16 is a block diagram of the volume layer log format of the storage I/O stack. As noted, each NVlog bucket 1600 is embodied as a circular log with allocation and reclamation pointers tracked in each log entry of the bucket. The bucket is organized to include a bucket header 1610 with information about the bucket, such as a size 1615, magic number 1612, a version number 1613 identifying the header format, and an error correction code 1616, e.g., a cyclic redundancy check (CRC), which may be used for error handling during replay to ensure that a correct bucket is provided to the volume layer. The NVlog bucket header 1610 is followed by one or more NVlog bucket log entries (log entries) 1620 and an NVlog footer 1618 which includes a magic number 1619 (the same or different from magic number 1612).

Log Entry

In an embodiment, each volume log entry 1620 includes a header 1630, a token ID 1640, a payload 1650 and footer. The header includes, inter alia, a current sequence number 1635 of the entry (i.e., NVlog entry sequence number) which is 64-byte increasing up counter, and a sequence number of the previous log entry 1636 that is active, e.g., for replay (i.e., a reclamation pointer sequence number or last valid NVlog sequence number). For instance, a current log entry having an entry sequence number of 1000 may also include a field that stores a sequence number (e.g., 900) of the previous log entry that will be replayed (i.e., that is active). Use of the previous log entry sequence number enables location of the reclamation pointer from a particular log entry, i.e., jumping to that log entry (900) during replay.

In addition, the header includes a current entry offset 1633 (e.g., relative to a start of the NVlog in NVRAM) of the log entry 1620 within the NVlog bucket (i.e., NVlog offset) as well as an offset of the previous log entry 1634 (i.e., last valid log entry NVlog offset), wherein the latter previous log entry offset is a reclamation pointer offset used during replay to directly locate the reclamation pointer. A magic number 1631 at the beginning of the log entries is used to effectively delimit log entries in the event of catastrophic failures where a first log entry results from a partial DMA at the beginning of the NVlog bucket.

Illustratively, the footer of the log entry includes an error correction code 1660 (e.g., CRC) for the entry, which may be used to determine partial DMA write requests and safely discard them, while the payload 1650 and token ID 1640 (e.g., a common payload) of the log entry describes the actual log entry. In an embodiment, the payload 1650 includes the type or operational code (op code) of FSM, the type of log entry (EOS log, OV/NV log, etc.), and the metadata pages being logged. The token ID is illustratively used to identify the FSM associated with the entry and to track active (i.e., outstanding) FSMs in the volume layer, as described. Note that multiple log entries may include a same token ID, which denotes that those log entries are associated with the same FSM.

In an embodiment, the entry sequence number 1635 logs the actual transaction 1520, while the token ID groups related transactions (or single transaction) by FSM. Note that each FSM operates for a predetermined number of transactions (i.e., transactions within the group). Upon a failure/crash and during recovery, only active transactions (and associated FSMs) at the time of the crash are replayed. Note that the token IDs may also be used for recovery and reclamation of log entries. During reclamation, the active token IDs are used to identify active log entries (i.e., outstanding entries having active FSMs) in the NVlog. As such, there may be a case where a token ID has been closed (the associated FSM has terminated), but the corresponding log entries cannot be reclaimed because they are blocked by another token ID (having an associated active FSM) ahead of them in the circular log. Illustratively, these blocked log entries may be queued (in a separate queue, not shown) until the blocking token ID is closed (i.e., the token ID is assigned a sentinel value indicating that the associated FSM has terminated). At that time, shadow data structures (that represent the state of the circular log in NVRAM) may be used to reclaim the queued log entries in steady-state. That is, the shadow data structures may be used to avoid reclamation deadlock. Notably, the shadow data structures may include a "last forced entry reclaimed sequence number" (not shown), which indicates the sequence number (entry sequence number 1635) of a last log entry reclaimed when the high watermark is exceeded. Reclamation of log entries may be monitored by tracking the reclamation pointer relative to the last forced entry reclaimed sequence number so as to manage allocation of quota pools, e.g., faster reclamation of log entries leading to greater log space that permits allocation of larger quota pools, whereas slower reclamation of log entries leading to smaller log space entails allocation of smaller quota pools.

FSM

As noted, a collection of log entries may be identified by the token ID associated with an FSM. Illustratively, the volume layer includes a plurality of FSMs that guarantee atomicity. Each FSM may be instantiated for a group of transactions organized to perform an indivisible operation such as, e.g., a dense tree merge operation, a recovery operation, an append buffer flush or delete operation, the latter of which may be inserted into an NVlog. Illustratively, each FSM of the volume layer is started by logging an entry having a token start value (a first token ID sentinel value) to the NVlog bucket with a new token ID associated with the started FSM. As the FSM progresses, more entries from processing the transaction are logged to the NVRAM and are tagged with the new token ID. Once the FSM completes, an entry is added to the NVlog bucket having a token end value (a second token ID sentinel value). At this point, the FSM is atomically committed to the NVRAM. Note that because the NVlog bucket may be implemented as a circular log, a terminated (i.e., closed) FSM transaction may be blocked from reclaiming its generated log entries by another active (i.e., open) FSM also reclaiming log entries. However, log entries generated by a terminated FSM may be safely discarded during replay because those entries may be discovered as closed (i.e., having token end identifiers) when the circular log is scanned during recovery.

In an embodiment, each FSM may have a different life cycle, e.g., some FSMs have shorter (and quicker) durations than others. Reclamation may thus be blocked, thereby rendering the log full. Reclamation blocking may be detected and corrected by, e.g., monitoring the quota pool and, once the pool is consumed up to a defined threshold (70%), closing any pending FSMs that have not yet completed. For example, if an FSM requires a number of operations to finish, but consumption of the NVlog bucket has exceeded the threshold because the FSM blocks reclamation, that FSM may be prematurely terminated (before completion of the operations) to enable reclamation of the NVlog bucket. In an embodiment, a dynamic deadlock detection process monitors each FSM and terminates any FSM exceeding the log size threshold. This, in turn, permits reclamation of (i.e., frees) the log space for subsequent transactions. Illustratively, during termination of an FSM ("flush state"), new FSMs are queued. A low watermark (e.g., 50% log quota pool space) may be employed, such that once the low watermark is reached, a new FSM may initiate execution.

In an embodiment, a sliding watermark window (50-70% log quota pool space) is used for flushing FSMs such that when a high point (e.g., 70%) of the sliding watermark window (not shown) is exceeded, one or more pending FSMs may be flushed. Once reclamation reduces the used log space below a low point (e.g., 50%) of the sliding watermark window, more pending FSMs may be flushed. In this manner, log space may be gradually reclaimed and re-allocated to quota pools, such that an amount of log space is usually available for allocation to quota pools, e.g., an amount of log space above the high point of the sliding watermark window (100%–70%=30%). Accordingly, accumulation of unprocessed FSMs is avoided as some FSMs are usually being processed.

Quota Pool

In an embodiment, there are eight (8) UP services and eight (8) corresponding NVlog buckets, wherein each bucket is organized as a circular log allocated from physical NVRAM space. To avoid reclamation blocking as previously described, the circular logs may be abstracted using a quota mechanism that allocates essentially a logical pool of NVRAM space that guarantees an amount (i.e., a reservation) of log storage space. As such, clients (e.g., the volume layer) need not be aware of the wrapping of the circular log. When a FSM starts, a quota pool of logical space sufficient for running the FSM (i.e., an expected amount of log space) is allocated to the FSM. If the quota pool is available, the FSM starts. If the quota pool is unavailable, the FSM is queued (and not started), e.g., to avoid a deadlock situation where an FSM starts but cannot finish due to insufficient resources. Specifically, when a FSM (merge FSM, delete FSM, insert FSM) starts, a quota pool of sufficient size is requested to support the collection of log entries expected to be generated by the FSM. Only if the entire requested quota pool is available will the FSM start; otherwise the FSM is queued until sufficient resources (quota pool) are available. Thus, instantiation of a FSM is dependent upon a sufficient resource allocation from the NVRAM space of a quota pool which, from the perspective of the FSM, is a contiguous log.

In an embodiment, the quota pool is allocated statically to a FSM, i.e., a reservation of an amount of log space requested for a quota pool. For each type of FSM (e.g., merge, delete, insert), a precise amount of log space (bytes) required by the FSM may be calculated or known a priori.

For example, an amount of log space required (i.e., generated output) by a merge FSM (i.e., a merge of one or more levels of the dense tree) is known to be at most a number of entries of a lowest level of the merge (i.e., the output result of the merger of the levels) along with a token start and token end. Accordingly, a static allocation quota may be provided for each class of FSM. Note that the number of FSM generated log entries may vary widely according to the class of FSM (e.g., 3 log entries for a simple insert FSM to many entries for a merge FSM that merges lower levels of the dense tree). Illustratively, when a FSM makes a request for a log (token start), a mapping table is examined to determine the class of FSM and the amount of expected log space (e.g., maximum amount of log space) required by that class of FSM. A determination is then made as to whether a quota pool having the amount of log space is available. If so, the FSM is started and, if not, the FSM is queued.

In an embodiment, allocation of quota is based on a worst case, i.e., maximum log space expected to be needed (i.e., generated log entries) by the FSM. Although the log buckets may be configured to avoid getting full (e.g., based on a rate of incoming I/O write requests), some FSMs may run longer than other FSMs, such that the long running FSMs may block reclamation, as previously noted. Concurrency control may be implemented for merge FSMs and delete FSMs, such that a number of outstanding merge and delete operations are limited (thus limiting a corresponding number of generated log entries). In addition, a ceiling (cap) may be provided for a number of outstanding PUTs. Illustratively, the logs may be sized to accommodate all of the FSMs for these outstanding operations (e.g., insert, delete, merge). If a particular FSMs is too slow, more CPU resources may be allocated to clear the log (i.e., increase processing by the FSM, so that log entries may be reclaimed); alternatively the FSM may be terminated.

Crash Recovery

Illustratively, when a node crashes, each layer of the I/O storage stack performs crash recovery. During crash recovery, the volume layer initiates a replay process by performing DMA read operations from NVRAM to memory so that the NVlog buckets are loaded into memory. Since the number of log buckets is the same as the number of UP services, the replay process may execute in parallel across the UP services (i.e., each UP service replays a different NVlog bucket). Broadly stated, the NVlog bucket is traversed (i.e., scanned) to identify a highest sequence number log entry indicating a last (i.e., latest) log entry from which a number of previous valid (active) log entries may be determined. Illustratively, log entries are in ascending time order; accordingly log entries may be traversed from oldest sequence number to newest sequence number while noting the token IDs (i.e., token ID field 1640) of each traversed entry to determine active FSMs at the time of the crash. The active FSMs may be added to the shadow data structures for replay purposes. Note that those log entries having closed token IDs (i.e., the sentinel value indicating terminated FSMs) are removed from the shadow structures thereby leaving only active, pending FSMs for replay.

After populating the shadow structures, the replay process may choose to rollback/roll forward the various FSMs based on a context of the FSM at the time of the crash. Classes of logs, i.e., old value (OV)/new value (NV) logs, are illustratively used to implement roll-forward/roll-back semantics. OV/NV logs copy old content of metadata or new content of metadata into the NVRAM. Based on context during recovery, either the old copy or the new copy may be used. Note that this is a general purpose log entry technique that enables roll-back or roll-forward during recovery (based on bytes of data wrapped around a log entry). For example, if an extent (e.g., a metadata page) is to be updated from 1 to 2, the values 1 and 2 are copied to the OV/NV logs and the type of extent is recorded, as well as the key (i.e., old copy=1, new copy=2). Based on context of the FSM, the extent may be fixed with either 1 or 2 during recovery (i.e., by the replay process). Assume now that the metadata page is 64 KB in length and 8 bytes are updated at the end of the page, the old copy=1, the new copy=2. Both OV/NV copies are maintained in NVRAM and, based on the FSM that aborted/crashed, recovery may involve rolling-forward or rolling-back. Illustratively, the appropriate information is then applied during recovery. Note that roll-forward includes the new copy of the metadata. At the end of replay, each UP service may destroy its serviced log bucket and declare that the replay is complete for that log bucket. Note also that during replay of FSMs, no new (fresh) log quotas need be allocated; the replayed FSMs simply use their respective prior quotas.

For example, the FSM may be associated with the delete operation inserted into the NVlog, and another FSM may be associated with processing of the circular log. The insert operation is illustratively idempotent such that, if a crash occurs during the next insert operation, the operation may be rolled back and restarted. Note that the delete is a roll-forward operation such that during crash recovery, the on-disk data structures are fixed to indicate how far the FSM has progressed and recovery can proceed from that point. That is, crash recovery may be attempted in the event of a failure wherein a context is provided to determine whether to roll-forward or roll-back. To roll-back, the FSM must be restarted; to roll-forward exactly once semantics (EOS) may be used to ensure any deletions are idempotent (i.e., if deletes have occurred, then roll-forward may be performed).

During replay a first step is to patch up (resolve) the OV/NV logs on-disk and/or in NVRAM as noted. Thereafter, the second step is to process those log entries that require roll-forward or roll-back. At least two passes through the NVlog bucket are required to (1) recover token IDs, i.e., determine which IDs (i.e., associated FSMs) are active, and (2) process the active token IDs (log entries) by highest sequence number, proceeding backwards from oldest to newest sequence number. Illustratively, log entries that are active are identified using the highest sequence number of log entry in accordance with the first pass through the NVlog bucket. The second pass traverses the log entries from oldest to newest (using the sequence numbers). Note that identification of the highest sequence number can be used to determine the oldest sequence number. In addition, the walk (i.e., traversal) from the beginning of the NV log bucket to the end of the bucket involves crawling (searching) for the highest sequence number. Illustratively, upon finding a sequence number that is lower than a last previous sequence number, the traversal is stopped and the previous highest sequence number (log entry) is parsed to determine a set of log entries that need to be replayed.

More specifically, the bucket header/footer 1610/1618 may be first inspected for consistency during the replay process, wherein such inspection includes checking the magic number 1612, size 1615, and error correction code 1616. Replay logic of the volume layer may then enter a scanning phase to scan the bucket for log entries from the beginning up to the highest current sequence number. The replay logic may validate the magic number and error correction code for each log entry. If the error correction code does not match, those log entries may be discarded as partial DMA operations and the scanning stops. Because each log entry maintains its size (e.g., entry size 1637), a next log entry may be efficiently traversed as long as the current log entry sequence number is one less than the next log entry. Illustratively, once the highest log entry sequence number is discovered, the reclamation pointer offset to the reclamation pointer is maintained in the log bucket. In the event that the first log entry in the bucket is discovered to be a partial DMA, scanning logic "crawls", e.g., 8 bytes at a time, to discover the next valid log entry based on the magic number of the entry. It should be noted that due to the nature of the circular log and the fact that each log entry is a variable size, the offset at which a wraparound occurs may lead to invalid entries from a previous loop/generation at the bottom of the log bucket. However these log entries may be safely ignored because those log entries have either incorrect error correction codes due to overwrites or their sequence numbers may be lower than the maximum identified sequence number.

Once the scanning phase completes and identifies any allocation and reclamation pointers in the log bucket, the shadow structures are prepared to organize the active FSMs. Illustratively, these shadow structures are populated during traversal of the log bucket between the reclamation and allocation pointers. Note that log entries having token IDs determined to be already closed (e.g., having the sentinel token ID) may be safely discarded because the associated FSMs are already complete. Similarly, if a partial DMA operation is encountered (e.g., because the error correction code does not match), all subsequent log entries from that point to the allocation pointer may be safely discarded because they represent partial DMA operations.

Advantageously, the technique described herein enables efficient organization of log entries into a class of FSM, wherein the FSM has a context with respect to roll-forward or roll-back. Transactions are organized and classified by operation type and bound to an execution engine (FSM). Depending on the state of the FSM at the time of a crash, recovery may perform in accordance with roll-back or roll-forward. In addition, the quota pool assigned/allocated to a FSM depends upon the type of operation and transactions. That is, allocations are made to the NVlog bucket based on the type of operation and the size of buffers for that operation. Recovery is performed based on the state of the FSM executing the type of operation at the time of the crash to determine whether recovery involves rolling-back to old (previous) metadata or rolling-forward to new (current) metadata associated with the operation.

In sum, the embodiments herein describe two aspects to logging: steady-state logging and recovery. For steady-state logging, the logs (NVlog bucket and log entries) are organized per UP service to facilitate (exploit) concurrency and have a physical layout/format using sequence numbers (in a header) and error correction code (in a footer) as well descriptions of the log entry (in a common payload) that includes a token ID to identify the type of FSM and the type of log entry. Illustratively, the log bucket resource is prevented from being over run through the use of quota pools, wherein a watermark for the quota pool is used to forcefully close certain FSMs that are long running and that prevent reclamation. In-memory shadow structures may be employed to manage any outstanding token IDs (FSM) as well as manage space reclamation by queueing those log entries that have not yet been reclaimed. Additionally, concurrency control and log size/bucket size are provided to ensure sufficient storage/log space for expected activities.

For crash recovery, two passes may be performed through the NV log bucket. Illustratively, the first pass is performed to find the active log entries and the second pass eliminates any FSMs that have completed/finished, leaving only active FSMs. Roll-forward or roll-back semantics may be then employed using OV/NV logs to replay the logs and repair the on-disk file system data structures.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving at a storage system an input/output (I/O) request, wherein the storage system includes a persistent memory coupled to a central processor (CPU) and one or more storage devices;
associating a transaction with the I/O request;
allocating a circular log from the persistent memory to a first finite state machine (FSM) for processing the transaction, the first FSM associated with a token identifier (ID);
logging a start entry in the circular log;
in response to processing the transaction, recording one or more entries to the circular log, each recorded entry including a sequence number and a token ID field;
in response to a crash of the storage system, scanning the recorded entries of the circular log to determine whether the first FSM is active at a time of the crash; and
in response to determining that the first FSM is active at the time of the crash, replaying the recorded entries of the circular log having the token ID as a value of the token ID field.

2. The method of claim 1 wherein scanning the recorded entries further comprises:
discarding the recorded entries failing a checksum.

3. The method of claim 2 wherein discarding the recorded entries failing the checksum further comprises:
scanning the circular log to identify a magic number so as to determine a next recorded entry, wherein each recorded entry includes the magic number.

4. The method of claim 1 wherein scanning the recorded entries further comprises:
adding the first FSM and a second FSM to a shadow structure, the second FSM associated with a sentinel value indicating that the second FSM is closed; and
removing each recorded entry having the sentinel value as the value of the token ID field.

5. The method of claim 1 wherein scanning the recorded entries further comprises:
making a first pass through the recorded entries to identify the first FSM as active at the time of the crash; and
making a second pass through the recorded entries to determine a highest sequence number of the recorded entries.

6. The method of claim 5 wherein making the second pass through the recorded entries further comprises:
  determining whether a current sequence number of a respective entry of the recorded entries is lower than a previous sequence number of a prior respective entry; and
  in response to determining that the current sequence number of the respective entry of the recorded entries is lower than the previous sequence number of the prior respective entry, assigning the previous sequence number as the highest sequence number.

7. The method of claim 1 wherein the persistent memory is one of a non-volatile random access memory and a solid state drive.

8. The method of claim 1 wherein replaying the recorded entries of the circular log further comprises:
  applying one of an old value log and a new value log to each replay entry of the circular log.

9. The method of claim 8 wherein applying the old value log further comprises:
  restarting the first FSM.

10. The method of claim 8 wherein applying the new value log further comprises:
  applying the new value log to a first replay entry of the circular log; and
  ensuring that replay of first replay entry is idempotent.

11. A system comprising:
  a storage array having one or more storage devices; and
  a node having a central processor (CPU) connected to a memory, a persistent memory and the storage array, the CPU configured to execute one or more processes stored in the memory, the one or more processes configured to:
    receive at a storage system an input/output (I/O) request;
    associate a transaction with the I/O request;
    allocate a circular log from the persistent memory to a first finite state machine (FSM) for processing the transaction, the first FSM associated with a token identifier (ID);
    log a start entry in the circular log;
    in response to processing the transaction, record one or more entries to the circular log, each recorded entry including a sequence number and a token ID field;
    in response to a crash of the storage system, scan the recorded entries of the circular log to determine whether the first FSM is active at a time of the crash; and
    in response to determining that the first FSM is active at the time of the crash, replay the recorded entries of the circular log having the token ID as a value of the token ID field.

12. The system of the claim 11 wherein the one or more processes configured to scan the recorded entries is further configured to:
  discard the recorded entries failing a checksum.

13. The system of claim 12 wherein the one or more processes configured to discard the recorded entries failing the checksum is further configured to:
  scan the circular log to identify a magic number so as to determine a next recorded entry, wherein each recorded entry includes the magic number.

14. The system of claim 11 wherein the one or more processes configured to scan the recorded entries is further configured to:
  add the first FSM and a second FSM to a shadow structure, the second FSM associated with a sentinel value indicating that the second FSM is closed; and
  remove each recorded entry having the sentinel value as the value of the token ID field.

15. The system of claim 11 wherein the one or more processes configured to scan the recorded entries is further configured to:
  make a first pass through the recorded entries to identify the first FSM as active at the time of the crash; and
  make a second pass through the recorded entries to determine a highest sequence number of the recorded entries.

16. The system of claim 15 wherein the one or more processes configured to make the second pass through the recorded entries is further configured to:
  determine whether a current sequence number of a respective entry of the recorded entries is lower than a previous sequence number of a prior respective entry; and
  in response to determining that the current sequence number of the respective entry of the recorded entries is lower than the previous sequence number of the prior respective entry, assign the previous sequence number as the highest sequence number.

17. The system of claim 11 wherein the persistent memory is one of a non-volatile random access memory and a solid state drive.

18. The system of claim 11 wherein the one or more processes configured to replay the recorded entries of the circular log is further configured to:
  apply one of an old value log and a new value log to each replay entry of the circular log.

19. The system of claim 18 wherein the one or more processes configured to apply the new value log is further configured to:
  apply the new value log to a first replay entry of the circular log; and
  ensure that replay of first replay entry is idempotent.

20. A non-transitory computer readable medium including program instructions for execution on one or more processors, the program instructions configured to:
  implement a storage input/output (I/O) stack that operates with a persistent
  memory coupled to the one or more processors and with one or more solid state drives (SSDs);
  receive an I/O request;
  associate a transaction with the I/O request;
  allocate a circular log from the persistent memory to a finite state machine (FSM) for processing the transaction, the FSM associated with a token identifier (ID);
  log a start entry in the circular log;
  in response to processing the transaction, record one or more entries to the circular log, each recorded entry including a sequence number and a token ID field;
  in response to a crash of the storage I/O stack, scan the recorded entries of the circular log to determine whether the FSM is active at a time of the crash; and
  in response to determining that the FSM is active at the time of the crash, replay the recorded entries of the circular log having the token ID as a value of the token ID field.

* * * * *